(12) United States Patent
Weaver et al.

(10) Patent No.: US 8,418,861 B1
(45) Date of Patent: Apr. 16, 2013

(54) TELEVISION WALL-MOUNT WITH INTEGRATED SHELVING

(76) Inventors: William Weaver, Brantford (CA); Laura Laidman, Branford (CA)

( * ) Notice: Subject to any disclaimer, the term of this patent is extended or adjusted under 35 U.S.C. 154(b) by 133 days.

(21) Appl. No.: 12/886,609

(22) Filed: Sep. 21, 2010

(51) Int. Cl.
*A47F 5/08* (2006.01)
*A47B 57/20* (2006.01)

(52) U.S. Cl.
USPC .................. 211/90.02; 211/208; 248/922

(58) Field of Classification Search ............. 211/87.01, 211/90.01, 90.02, 90.04, 103, 117, 119.003, 211/187, 153, 207, 208; 108/42, 50.01, 50.11; 248/917, 918, 922, 923, 919, 920
See application file for complete search history.

(56) References Cited

U.S. PATENT DOCUMENTS

| | | | |
|---|---|---|---|
| 4,487,389 A | | 12/1984 | Ziegler |
| 4,972,783 A * | | 11/1990 | Crissman et al. ............. 108/107 |
| 5,207,792 A | | 5/1993 | Anderson |
| 5,280,841 A * | | 1/1994 | Van Deursen ................ 211/197 |
| D401,084 S | | 11/1998 | Martin |
| 6,089,387 A * | | 7/2000 | Varfolomeeva ............ 211/181.1 |
| D458,053 S * | | 6/2002 | Luong ............................ D6/477 |
| 6,520,351 B1 * | | 2/2003 | Zadro ............................ 211/119 |
| D474,047 S * | | 5/2003 | Lara ............................... D6/479 |
| 6,581,887 B2 | | 6/2003 | Lapidez |
| D480,237 S * | | 10/2003 | de Carolis ..................... D6/474 |
| D495,163 S | | 8/2004 | Weatherly |
| D507,900 S * | | 8/2005 | Sexton ........................... D6/474 |
| D508,171 S * | | 8/2005 | Choo ............................. D6/477 |
| D508,801 S * | | 8/2005 | Holst ............................. D6/477 |
| 6,987,666 B2 | | 1/2006 | Medica et al. |
| D517,349 S * | | 3/2006 | Lara ............................... D6/477 |
| D537,658 S * | | 3/2007 | Tung ............................. D6/479 |
| D539,565 S * | | 4/2007 | Sexton, III ..................... D6/474 |
| D541,138 S * | | 4/2007 | Whalen et al. ................. D8/354 |
| 7,261,261 B2 | | 8/2007 | Ligertwood |
| D563,774 S * | | 3/2008 | Wohlford et al. ............. D8/363 |
| D564,261 S * | | 3/2008 | Sculler .......................... D6/477 |
| D564,796 S * | | 3/2008 | Zambelli ....................... D6/477 |
| D566,426 S * | | 4/2008 | Stenhouse et al. ............. D6/474 |
| D567,546 S * | | 4/2008 | Liu ................................ D6/479 |
| D570,620 S * | | 6/2008 | Ongor ........................... D6/479 |
| 7,384,021 B2 | | 6/2008 | Liao |
| D576,427 S * | | 9/2008 | Stebbens et al. ............... D6/477 |
| 7,448,584 B2 | | 11/2008 | Chen et al. |
| D581,914 S * | | 12/2008 | Bures et al. .................. D14/239 |
| 7,487,943 B1 * | | 2/2009 | Gillespie ..................... 248/282.1 |
| D590,636 S * | | 4/2009 | Ou Yang et al. ............... D6/477 |
| 7,513,469 B1 * | | 4/2009 | Ciungan ....................... 248/161 |
| 7,513,474 B2 * | | 4/2009 | Anderson et al. .......... 248/284.1 |
| 7,530,538 B2 * | | 5/2009 | Whalen et al. ............. 248/125.8 |
| D595,977 S * | | 7/2009 | Stebbens et al. ............... D6/477 |
| D595,978 S * | | 7/2009 | Portnoy et al. ................. D6/477 |
| D618,015 S * | | 6/2010 | Sexton ........................... D6/477 |
| D627,787 S * | | 11/2010 | Grey et al. .................... D14/452 |

(Continued)

*Primary Examiner* — Darnell Jayne
*Assistant Examiner* — Stanton L Krycinski
(74) *Attorney, Agent, or Firm* — Kyle Fletcher

(57) ABSTRACT

The television wall-mount with integrated shelving is an accessory that either mounts to a rear surface of a television or a wall-mount television to a television. The shelving accessory descends from below said television to provide at least one shelf for showcasing items used in playing audio-video upon said television. The shelving accessory is capable of lateral as well as vertical adjustment with respect to the television. The shelving accessory can also rotate about a vertical axis and in concert with the television and wall-mount in order to provide greater viewing angle of said television.

9 Claims, 5 Drawing Sheets

U.S. PATENT DOCUMENTS

| | | | |
|---|---|---|---|
| 7,823,847 B2 * | 11/2010 | Bremmon et al. | 248/201 |
| 7,854,415 B2 * | 12/2010 | Holbrook et al. | 248/125.2 |
| 2003/0141425 A1 * | 7/2003 | Obdeijn | 248/317 |
| 2004/0188573 A1 | 9/2004 | Weatherly | |
| 2008/0105633 A1 * | 5/2008 | Dozier et al. | 211/26 |
| 2009/0039212 A1 * | 2/2009 | Whalen et al. | 248/158 |
| 2009/0200439 A1 * | 8/2009 | Bremmon et al. | 248/183.1 |

* cited by examiner

TELEVISION WALL-MOUNT WITH INTEGRATED SHELVING

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of television wall mounts, more specifically, a wall mount that includes an integrated shelving that swivels and rotates with the television.

B. Discussion of the Prior Art

As will be discussed immediately below, no prior art discloses an accessory to a wall-mounted television or a wall-mount with shelving integrated therein; wherein the accessory supports at least one shelf from below said television in order to showcase a cable box or DVD player from below said television; wherein said accessory can rotate with the television via the applicable mounting bracket.

The Weatherly Patent (U.S. Pat. No. 7,195,213) discloses a television support bracket that has a plurality of adjusting shelves. However, the adjustable shelves adjust vertically with respect to the television, and do not rotate with the television in order to increase the viewing angle of the television and items resting upon said shelves.

The lapidez Patent (U.S. Pat. No. 6,581,887) discloses a rotatable television mounting assembly. However, the mounting assembly does not teach adjustable shelves that can rotate in concert with a television and can adjust vertically with respect to said television.

The Chen et al. Patent (U.S. Pat. No. 7,448,584) discloses a wall mounting bracket. Again, the bracket does not teach or disclose at least one shelf that extends from below a television to support objects thereon.

The Liao Patent (U.S. Pat. No. 7,384,021) discloses a rotation mechanism for televisions. Again, the rotating mechanism fails to teach shelves that descend from below a wall-mounted television.

The Lingertwood Patent (U.S. Pat. No. 7,261,261) discloses a television stand having a shelf for holding video accessories. Again, the television stand fails to teach shelves that descend from below a wall-mounted television.

The Cho et al. Patent (U.S. Pat. No. 6,502,792) discloses a support stand for an LCD monitor that is multi-leveled and can be wall mounted. Again, the stand fails to teach shelves that descend from below a wall-mounted television.

The Ziegler Patent (U.S. Pat. No. 4,487,389) discloses a device attachable to a wall for supporting relatively heavy articles such as television sets. Again, the device fails to teach shelves that descend from below a wall-mounted television.

The Medica et al. Patent (U.S. Pat. No. 6,987,666) discloses a flat panel monitor stand that includes a configurable base with a swivel base. However, the stand fails to support a monitor upon a wall, or disclose shelves descending from under a wall-mounted monitor or television.

While the above-described devices fulfill their respective and particular objects and requirements, they do not describe an accessory to a wall-mounted television or a wall-mount with shelving integrated therein; wherein the accessory supports at least one shelf from below said television in order to showcase a cable box or DVD player from below said television; wherein said accessory can rotate with the television via the applicable mounting bracket. In this regard, the television wall-mount with integrated shelving departs from the conventional concepts and designs of the prior art.

SUMMARY OF THE INVENTION

The television wall-mount with integrated shelving is an accessory that either mounts to a rear surface of a television or a wall-mount television to a television. The shelving accessory descends from below said television to provide at least one shelf for showcasing items used in playing audio-video upon said television. The shelving accessory is capable of lateral as well as vertical adjustment with respect to the television. The shelving accessory can also rotate about a vertical axis and in concert with the television and wall-mount in order to provide greater viewing angle of said television.

It is an object of the invention to provide a shelving accessory for use with a wall-mounted television that descends from below said television to support at least one shelf for items usually associated with the use of a television.

A further object of the invention is to provide a shelving accessory that can be adjusted vertically as well as horizontally with respect to said television.

A further object of the invention is to provide a shelving accessory that can rotate about a vertical axis in concert with a television in order to provide greater viewing and adjustability.

A further object of the invention is to provide a shelving accessory that can attach to a rear surface of said television or attach onto or be integrated with a wall-mount for a television.

These together with additional objects, features and advantages of the television wall-mount with integrated shelving will be readily apparent to those of ordinary skill in the art upon reading the following detailed description of presently preferred, but nonetheless illustrative, embodiments of the television wall-mount with integrated shelving when taken in conjunction with the accompanying drawings.

In this respect, before explaining the current embodiments of the television wall-mount with integrated shelving in detail, it is to be understood that the television wall-mount with integrated shelving is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the television wall-mount with integrated shelving.

It is therefore important that the claims be regarded as including such equivalent construction insofar as they do not depart from the spirit and scope of the television wall-mount with integrated shelving. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
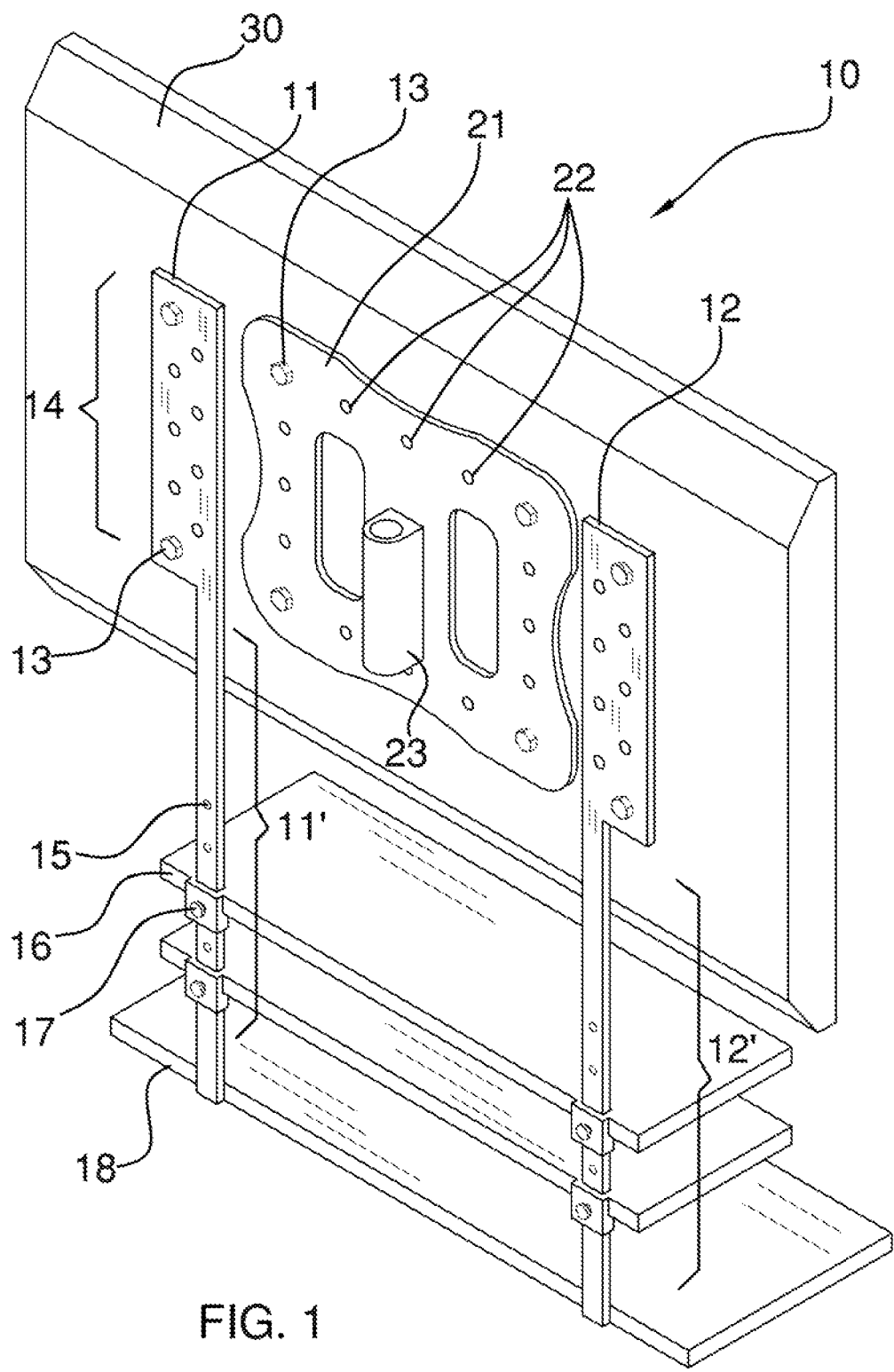
FIG. 1 illustrates a rear, isometric view of the television wall-mount with integrated shelving installed upon an existing television whereby depicting separate mounting points for the wall-mount for the television and the adjustable shelves descending there under.
Figure 2:
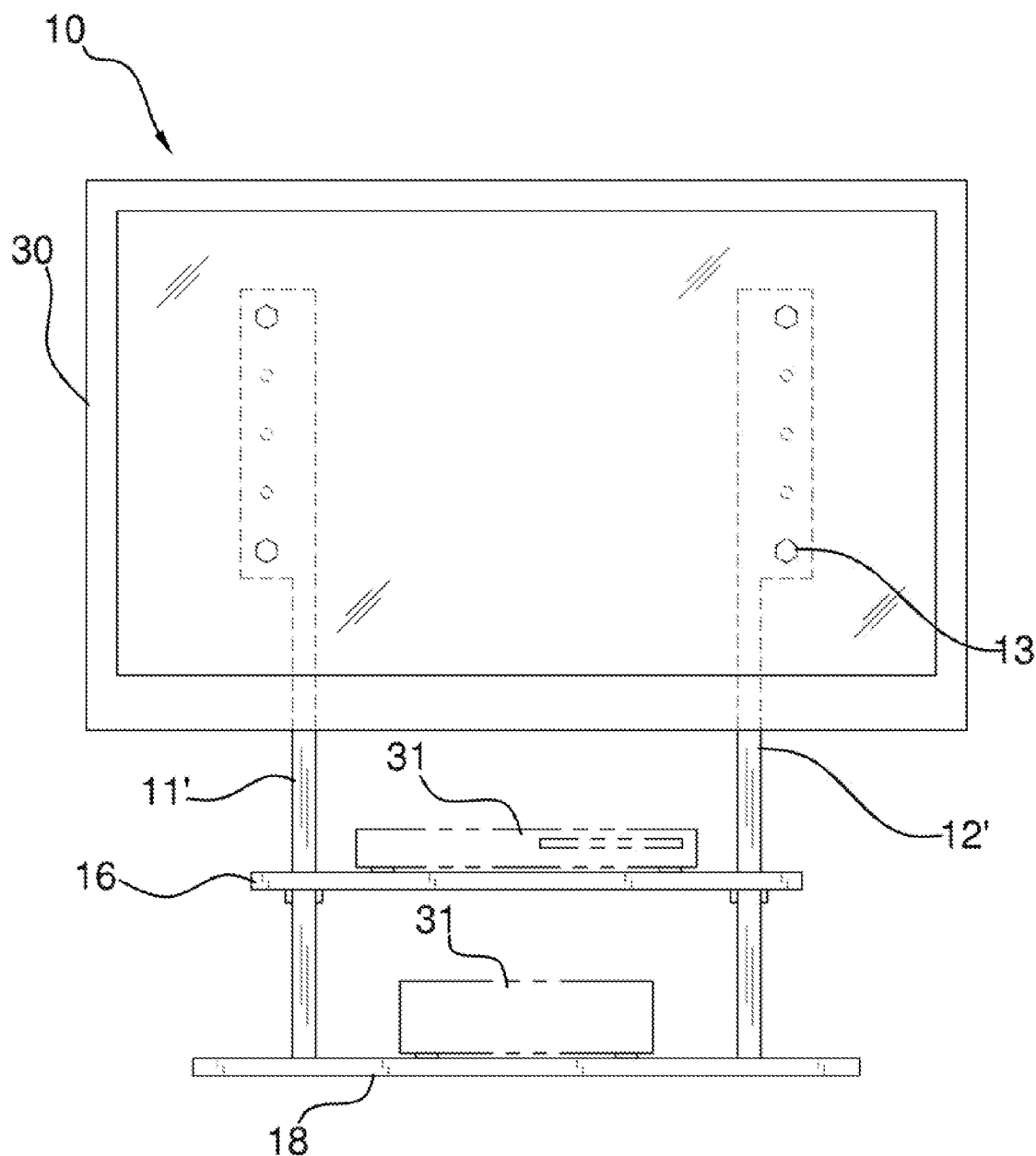
FIG. 2 illustrates a front view of the television wall-mount with integrated shelving installed upon a television, depicting various items placed upon shelves descending from below said television, wherein dashed lines depict the mounting hardware for the adjustable shelves that attach directly to a rear surface of said television.
Figure 3:
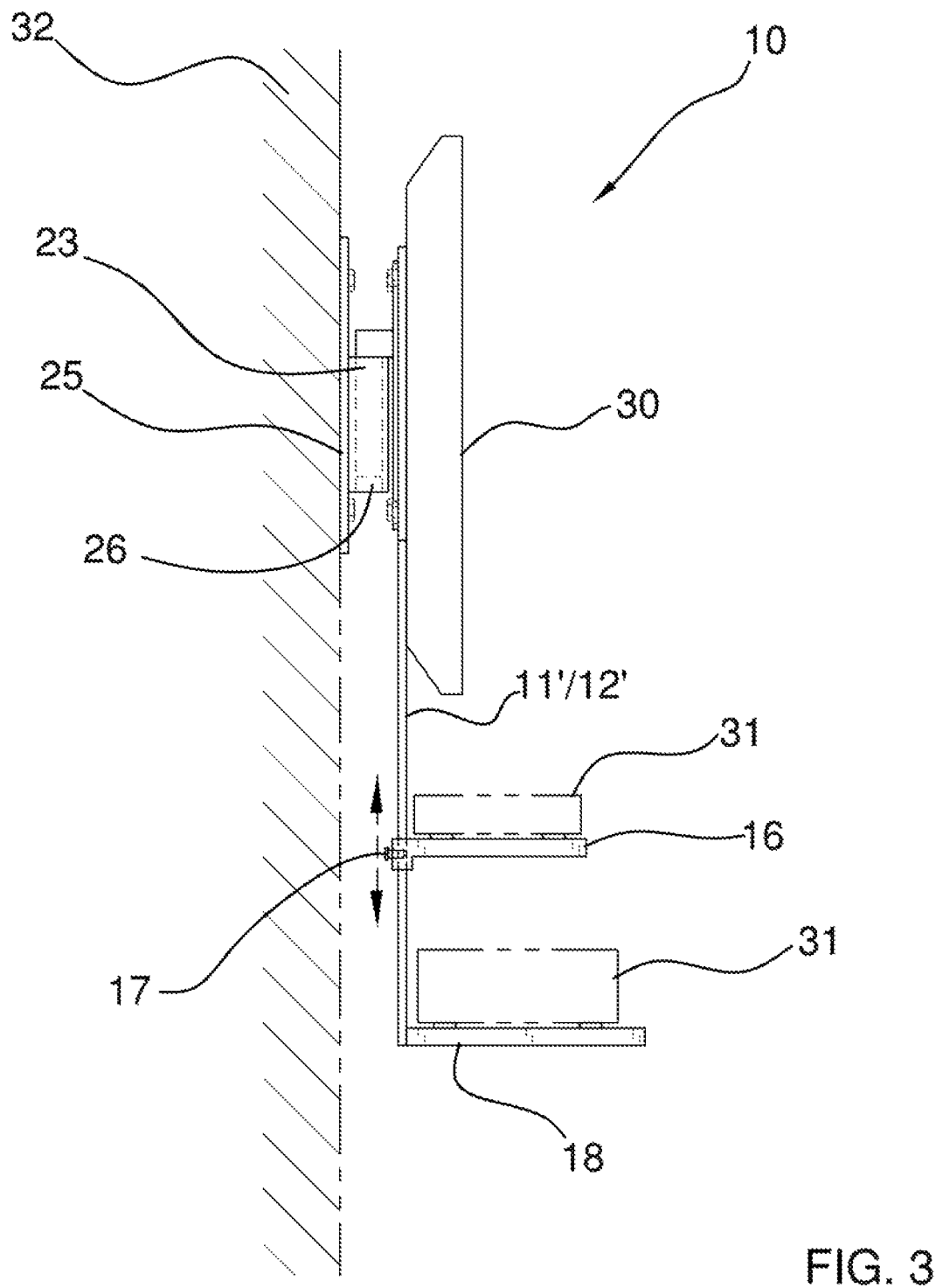
FIG. 3 illustrates a side view of the television wall-mount with integrated shelving in use with a television and attached to a wall; wherein items are being supported by the adjustable shelving; wherein an arrow indicates vertical movement of one of the shelves.
Figure 4:
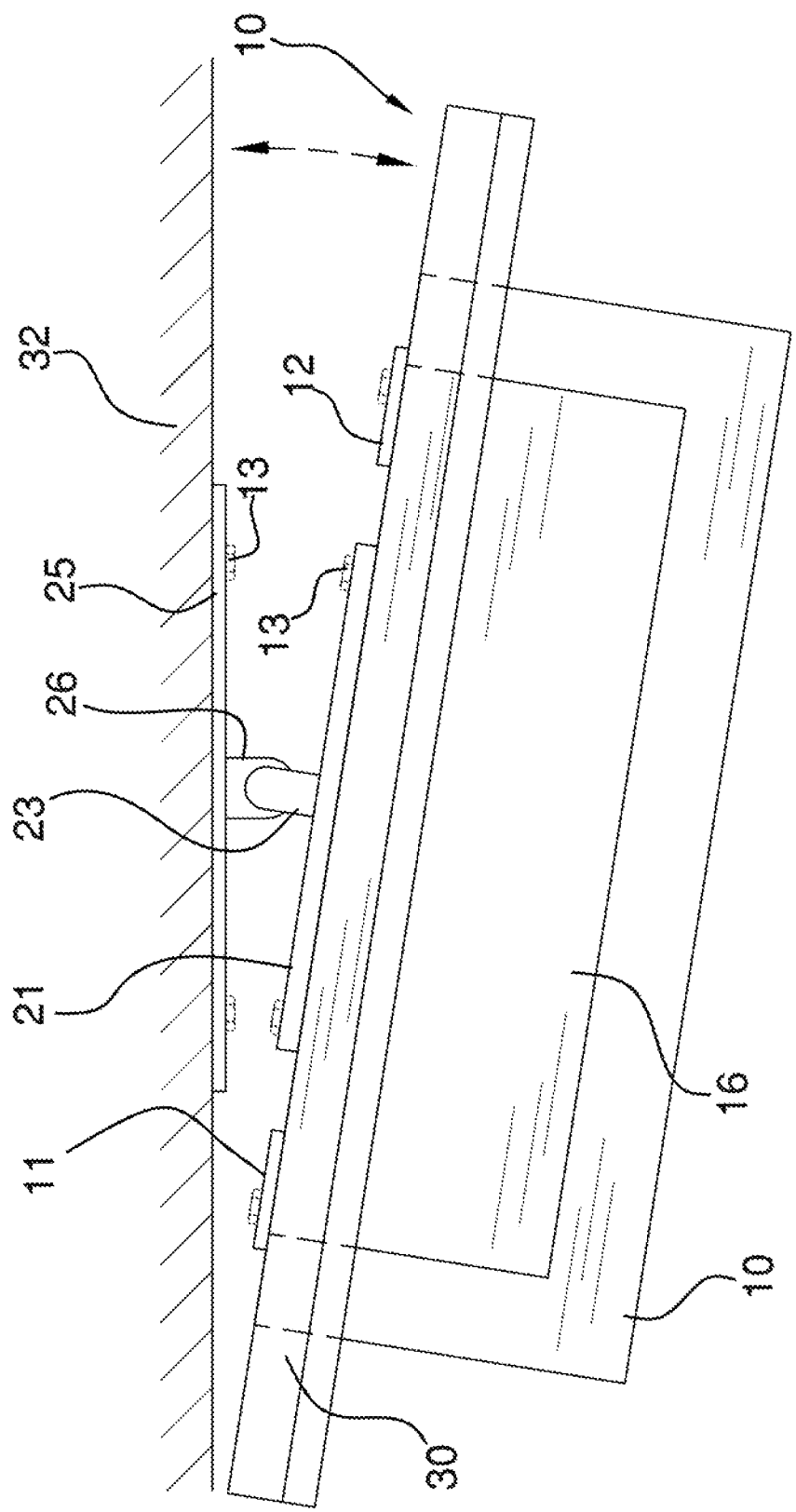
FIG. 4 illustrates a top view of the television wall-mount with integrated shelving installed upon a wall and depicting rotational movement via an arrow of the television about the wall-mounting bracket along a vertical axis.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A television wall-mount with integrated shelving 10 (hereinafter invention) includes a first bracket 11 and a second bracket 12 that both attach to a rear surface of a television 30 via attaching means 13. The first bracket 11 and the second bracket 12 have a plurality of holes 14 through which the attaching means 13 secure the invention 10 to said television 30. The attaching means 13 comprise a bolt and nut, screw, or a rivet. It shall be noted that the use of bolt and nut as the attaching means 13 usually involves a threaded hole located on the television 30 through which a bolt is crewed thereon.

The first bracket 11 and the second bracket 12 may be mirror images of one another, in that both said brackets have an elongated member 11'/12' that extends below said television 30. The elongated members 11'/12' each have holes 15 located thereon.

A top shelf 16 is slidably engaged upon both of the elongated members 11'/12' and can adjust the top shelf 16 vertically with respect to the elongated members 11'/12'. The top shelf 16 includes spring-loaded pins 17 that can extend to lock the top shelf 16 in place along the holes 15 of the elongated members 11'/12'. Thus, the top shelf 16 can adjust the height vertically with respect to the television 30 via the spring-loaded pins 17 engaging holes 15 at varying locations along the elongated members 11'/12'.

However, it shall be noted that a plurality of top shelves 16 may be slidably engaged upon the elongated members 11'/12'. It shall be further noted that the top shelf 16 may be smaller in surface area when compared to a bottom shelf 18.

The bottom shelf 18 is affixed to a bottom end of the elongated members 11'/12'. Both the top shelf/shelves 16 and the bottom shelf 18 can support items 31 thereon. The term items 31 is hereby being used to define objects associated with the transmission of audiovisual signals to said television 30, and comprise a cable box, satellite box, DVD player, VHS player, or like electronics.

A wall-mount bracket 21 is included with the invention 10 and is used to mount the television 30 to a wall 32 or vertically-oriented surface. The wall-mount bracket 21 attaches to a rear surface of the television 30 via attaching means 13. The wall-mount bracket 21 has a plurality of holes 22 located thereon in order to accommodate different mounting holes and television sizes.

The wall-mount bracket 21 includes a mounting piece 23 that extends away from a rear surface of the wall-mount bracket 21. The mounting piece 23 is comprised of a vertically oriented cylinder that is secured to the wall-mount bracket 21.

A wall-mounting plate 25 attaches to the wall 32 via attaching means 13. The wall-mounting plate 25 is responsible for supporting the weight of the invention 10, the television 30, and the items 31. That being the case, it is important that structural load bearing weights be take into consideration when mounting the wall-mounting plate 25 to the wall 32, and usually involve using large screws to screw into load bearing studs that make up said wall 32, which are well known in the art.

The wall-mounting plate 25 includes a support rod 26 that extends away from said wall-mounting plate 25 as well as extending vertically. The mounting piece 23 is placed upon the support rod 26, and thus supports the invention 10 thereon. The configuration of the mounting piece 23 onto the support rod 26 enables the television 30 as well as the shelves 16 and 18 to rotate with respect to the wall 32. The mounting piece 23 slides upon the support rod 26 to enable rotational movement of the television 30 in order to adjust the viewing area of the television 30. Coincidentally, the shelves 16 and 18 rotate with the television 30 such that the items 31 located thereon are more easily operated via a remote control located at an angle consistent with the angle formed between the invention 10 and the television 30 and the wall 32.

Figure 5:
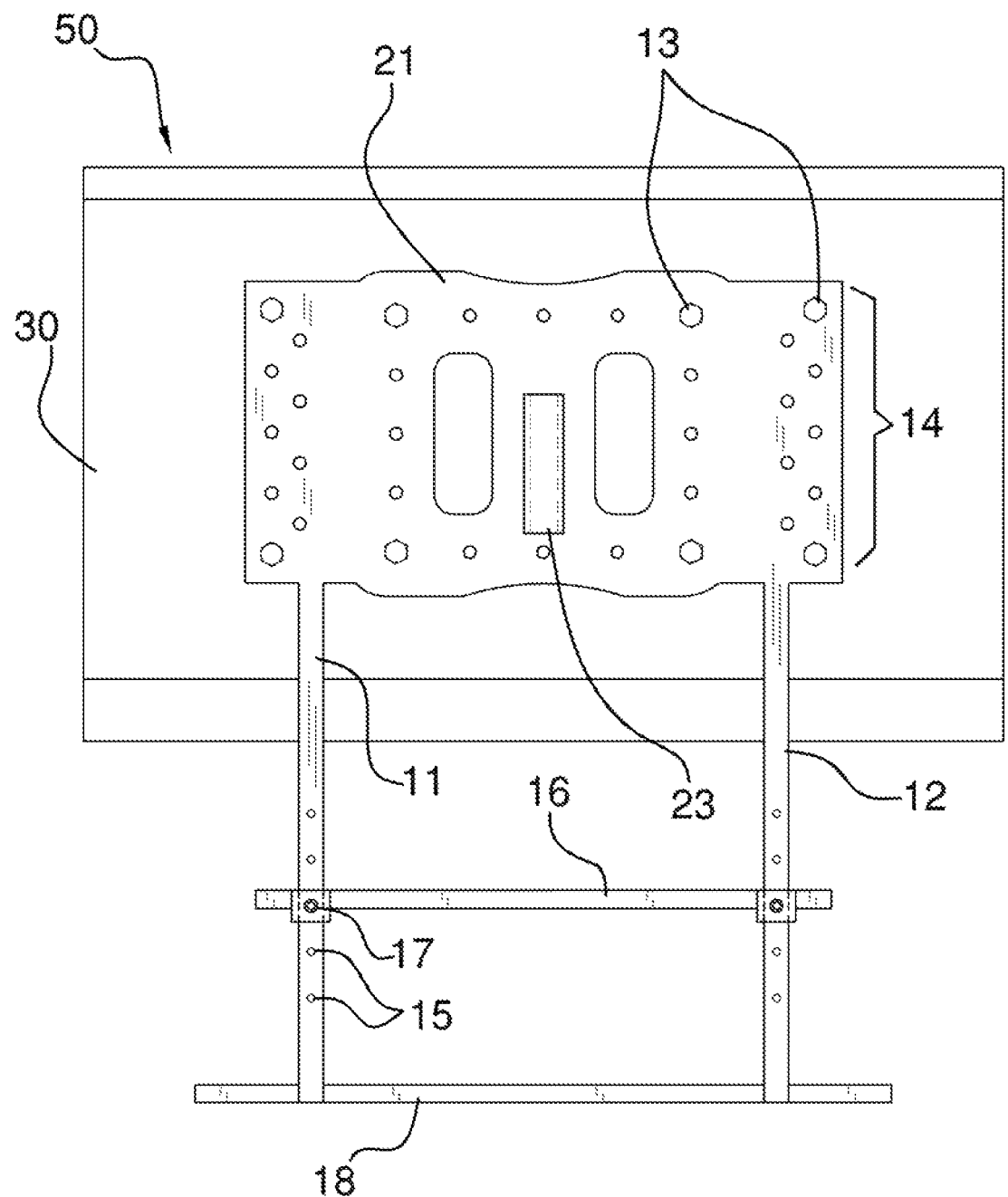
FIG. 5 illustrates a rear view of an alternative embodiment of the television wall-mount with integrated shelving wherein both the adjustable shelves mounting hardware is integrated with the wall-mounting hardware such that both the wall-mounting bracket and adjustable shelves attach singularly to a rear surface of said television.

Referring to FIG. 5, an alternative embodiment 50 of the invention 10 simply integrates the first and second brackets 11 and 12 into the wall-mounted bracket 21 forming a single piece construction. All other features and descriptions pertaining to the invention 10 are implicitly associated with the alternative embodiment 50 with the exception being that the shelves 16 and 18 rotate with the wall-mount bracket 21 as opposed to with the television 30 as described above.

With respect to the above description, it is to be realized that the optimum dimensional relationship for the various components of the invention 10 and the alternative embodiment, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10 and the alternative embodiment 50.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. Adjustable shelves for use with a wall-mounted television comprising:
    a first bracket and a second bracket configured to attach to a rear surface of an existing television and include elongated members extending from below said television in order to support shelves thereon;
    wherein a top shelf slidably engages the elongated members in order to vertically adjust said top shelf with respect to said television;
    wherein a bottom shelf is affixed to the elongated members;
    wherein a wall-mount bracket attaches to a rear surface of said television and includes a mounting piece that slidably engages upon a support rod extending vertically from a wall-mounting plate configured to affix to an existing wall;
    wherein the support rod extends away from said wall-mounting plate, and extends vertically;
    wherein the wall-mount bracket and in turn television can rotate about said wall-mounting plate;
    wherein said shelves can rotate with said television;
    wherein the shelves and the television are supported on said wall surface, and not on a ground or floor surface;
    wherein the elongated members include a plurality of holes aligned along a length of the elongated members engaged by spring-loaded pins located on the top shelf to slidably adjust the top shelf along a length of the elongated members.

2. The adjustable shelves as described in claim 1 wherein a plurality of top shelves slidably engage upon said elongated members.

3. The adjustable shelves as described in claim 1 wherein attaching means are used to secure the first and second bracket to the television, to secure the wall-mount bracket to the television, and to secure the wall-mounting plate to the wall.

4. The adjustable shelves as described in claim 3 wherein the attaching means comprises nut and bolts, rivets, or screws.

5. The adjustable shelves as described in claim 1 wherein the first and second bracket are integrated into a single-piece construction with the wall-mount bracket.

6. Adjustable shelves for use with a wall-mounted television comprising:
    a first bracket and a second bracket configured to attach to a rear surface of an existing television and include elongated members extending from below said television in order to support shelves thereon; wherein a top shelf slidably engages the elongated members in order to vertically adjust said top shelf with respect to said television;
    wherein a bottom shelf is affixed to the elongated members;
    wherein a wall-mount bracket attaches to a rear surface of said television and includes a mounting piece that slidably engages upon a support rod extending vertically from a wall-mounting plate configured to affix to an existing wall;
    wherein the support rod extends away from said wall-mounting plate, and extends vertically;
    wherein the mounting piece is of cylindrical construction that is vertically oriented and secured to a rear surface of the wall-mount bracket;
    wherein the wall-mount bracket and in turn television can rotate about said wall-mounting plate;
    wherein said shelves can rotate with said television;
    wherein the shelves and the television are supported on said wall surface, and not on a ground or floor surface
    wherein the elongated members include a plurality of holes aligned along a length of the elongated members engaged by spring-loaded pins located on the top shelf to slidably adjust the top shelf along a length of the elongated members.

7. The adjustable shelves as described in claim 6 wherein a plurality of top shelves slidably engage upon said elongated members.

8. The adjustable shelves as described in claim 6 wherein attaching means are used to secure the first and second bracket to the television, to secure the wall-mount bracket to the television, and to secure the wall-mounting plate to the wall.

9. The adjustable shelves as described in claim 6 wherein the first and second bracket are integrated into a single-piece construction with the wall-mount bracket.

\* \* \* \* \*